United States Patent Office 3,803,185
Patented Apr. 9, 1974

3,803,185
NOVEL 2,4-DIENAMIDES
Clive A. Henrick and John B. Siddall, Palo Alto, Calif., assignors to Zoecon Corporation, Palo Alto, Calif.
No Drawing. Continuation-in-part of abandoned application Ser. No. 201,191, Nov. 22, 1971, which is a continuation-in-part of application Ser. No. 187,897, Oct. 8, 1971, now Patent No. 3,755,411, which in turn is a continuation-in-part of applications Ser. No. 111,650, Feb. 1, 1971, now Patent No. 3,729,486, Ser. No. 111,702, Ser. No. 111,765, Ser. No. 111,766, and Ser. No. 111,770, all Feb. 1, 1971, all now abandoned, and Ser. No. 115,725, Feb. 16, 1971, now Patent No. 3,706,733. This application June 26, 1972, Ser. No. 266,031
Int. Cl. C07c 103/30
U.S. Cl. 260—404
36 Claims

ABSTRACT OF THE DISCLOSURE

Aliphatic hydrocarbon substituted di-olefinic amides, intermediates therefor, syntheses thereof, and the control of insects.

---

This is a continuation-in-part of application Ser. No. 201,191, filed Nov. 22, 1971, now abandoned, which is, in turn a continuation-in-part of application Ser. No. 187,897, filed Oct. 8, 1971, now U.S. Pat. 3,755,411, which is a continuation-in-part of applications Ser. No. 111,650, filed Feb. 1, 1971, now U.S. Pat. 3,729,486, Ser. No. 111,702, filed Feb. 1, 1971, now abandoned; Ser. No. 111,765, filed Feb. 1, 1971, now abandoned; Ser. No. 111,766, filed Feb. 1, 1971, now abandoned; Ser. No. 111,770, filed Feb. 1, 1971, now abandoned; and Ser. No. 115,725, filed Feb. 16, 1971, now U.S. Pat. 3,706,733, the entire disclosures of which are incorporated by reference.

This invention relates to novel aliphatic di-olefinic compounds, aliphatic tri-olefinic compounds, intermediates therefor, syntheses thereof, and the control of insects. More particularly, the novel di-olefinic compounds of the present invention are represented by the following formula:

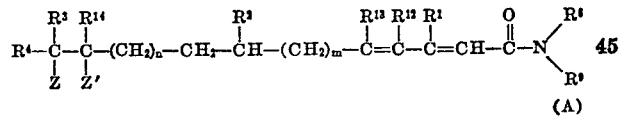

(A)

wherein,

Z is bromo, chloro, fluoro or the group —OR in which R is hydrogen, carboxylic acyl, lower alkyl, cycloalkyl, aralkyl or aryl;
Z' is hydrogen, bromo, chloro or fluoro;
each of $m$ and $n$ is zero or the positive integer one, two or three;
each of $R^1$ and $^2$ is lower alkyl;
$R^4$ is alkyl;
each of $R^3$, $R^{12}$, $R^{13}$ and $R^{14}$ is hydrogen or lower alkyl; and
each of $R^3$ and $R^9$ is hydrogen, alkyl, lower alkenyl, lower alkynyl, cycloalkyl, hydroxyalkyl, alkoxyalkyl, alkylthiaalkyl, aryl or aralky or, when taken together with the nitrogen atom to which they are attached, pyrrolidino, morpholino, piperidino, piperazino or 4-alkylpiperazino, provided that when Z' is bromo, chloro or fluoro, then Z is bromo, chloro or fluoro, respectively.

The compounds of Formula A are useful for the control of insects. The utility of these compounds as insect control agents is believed to be attributable to their juvenile horomone activity. They are preferably applied to the immature insect, namely—during the embryo, larvae or pupae stage in view of their effect on metamorphosis and otherwise cause abnormal development leading to death or inability to reproduce. These compounds are effective control agents for Hemipteran, such as Lygaeidae, Miridae and Pyrrhocoridae, Lepidopteran, such as Pyralidae, Noctuidae and Gelechiidae; Coleopteran, such as Tenebrionidae, Crysomelidae and Dermestirdae; Dipteran such as mosquitos, flies; Homopteran, such as aphids and other insects. The compounds can be applied at low dosage levels of the order of 0.001 µg. to 25.0 µg. per insect. Suitable carrier substances include liquid or solid carriers, such as water, acetone, xylene, mineral or vegetable oils, talc, vermiculite, natural and synthetic resins and silica. Treatment of insects in accordance with the present invention is accomplished by spraying, dusting or exposing the insects to the vapor of the compounds of Formula A. Generally, a concentration of less than 25% of the active compound is employed. The formulations can include insect attractants, emulsifying agents or wetting agents to assist in the application and effectiveness of the active ingredient. In the application of the compounds, there is generally employed a mixture of the C-2,3 trans and cis isomers.

In the description hereinafter, each of R—$R^4$, $R^8$, $R^9$, $R^{12}$—$R^{14}$, Z, Z', $m$ and $n$ is as defined hereinabove, unless otherwise specified.

In another embodiment of the present invention, there is provided compounds of the following Formula B which are useful for the control of insects in the same manner as the di-olefinic compounds of Formula A and which also serve as precursors for the preparation of the compounds of Formula A.

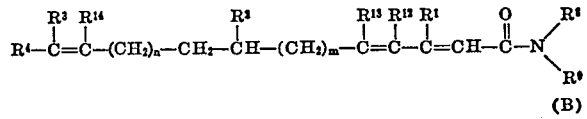

(B)

The compounds of the present invention can be prepared by the reaction of an acid chloride or acid bromide of Formula C with the appropriate amine of the formula:

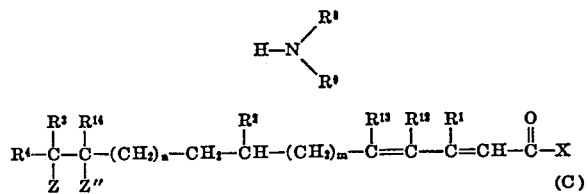

(C)

wherein, X is bromo or chloro, Z is as above and Z" is hydrogen, bromo, chloro, fluoro or, when taken with Z, forms a carbon-carbon bond. The synthesis of the acid halides of Formula C is described in application Ser. No. 187,897, filed Oct. 8, 1971, now U.S. Pat. 3,755,411.

The novel amides of the present invention can be prepared also by the reaction of a carbonyl of Formula I with a carbanion of the formula [R' is lower alkyl, cycloalkyl or phenyl]:

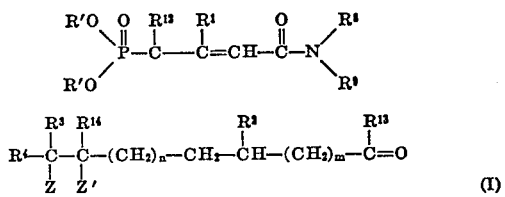

(I)

In Formula I, each of Z and Z' is as defined above with the exception that halogen is excluded. The carbanion is generated by treatment of the corresponding phosphonamide with base, such as alkali metal hydride or alkali metal alkoxide.

The amides can be prepared also by reaction of a carbonyl of Formula III with a carbanion or ylid of the following formulas, respectively:

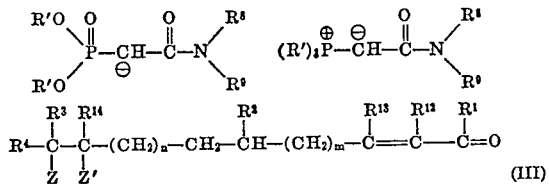

In Formula III, each of Z and Z' is as defined above with the exception that halogen is excluded.

Another method for preparation of the amides of the present invention is the reaction of an alkynyl alcohol of Formula IV with an amide ketal to afford an allenic amide of the formula:

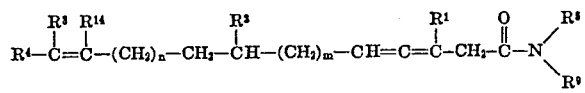

which is rearranged to the 2,4-diene system under basic conditions such as described in copending application Ser. No. 111,768, filed Feb. 1, 1971, now U.S. Pat. 3,716,565.

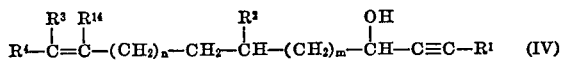

The synthesis of the compounds of Formulas I, III and IV is described in application Ser. No. 187,897, filed Oct. 8, 1971, the disclosure of which is incorporated by reference.

The compounds of Formula A, wherein Z' is hydrogen and Z is halo, can be prepared by treating a compound of Formula B with hydrogen halide in carbon tetrachloride or other halogenated hydrocarbon solvents of low dielectric constant. The compounds of Formula A, wherein Z' is halo, can be prepared by treating a compound of Formula B with bromine, chlorine or fluorine in a halogenated hydrocarbon solvent.

The compounds of Formula A, wherein Z' is hydrogen and Z is the group —OR in which R is hydrogen, can be prepared by the addition of water to the terminal olefinic bond of a compound of Formula B using a mercuric salt followed by reduction of the oxymercurial intermediate in situ. Suitable mercuric salts include mercuric acetate, mercuric nitrate, mercuric trifluoroacetate, mercuric acylates and mercuric halides. Suitable reducing agents include borohydrides, hydrazine and sodium amalgam. See Brown and Rei, J. Am. Chem. Soc. 91, 5646 (1969); Brown et al., J. Am. Chem. Soc. 89, 1522 and 1524 (1967); and Wakabayashi, J. Med. Chem. 12, 191 (January 1969). By conducting the reaction in the presence of an alcohol (R—OH), such as methanol, ethanol, isopropyl alcohol, benzyl alcohol, cyclopentanol, and the like, the corresponding ether is prepared. The compounds of Formula A, wherein Z is —OR in which R is carboxylic acyl and Z' is hydrogen, can be prepared from a compound of Formula A, wherein Z is —OH and Z' is hydrogen, by reaction with a carboxylic acid chloride or bromide or carboxylic acid anhydride in pyridine or by treatment with a carboxylic acid anhydride in the presence of sodium acetate. The reaction is generally conducted at about room temperature to reflux temperature for about one to forty-eight hours, shorter reaction time being favored by temperatures above room temperature.

The term "cycloalkyl", as used herein, refers to a cyclic alkyl group of three to eight carbon atoms. The term "aralkyl" refers to a monovalent hydrocarbon group in which an aryl group is substituted for a hydrogen atom of an alkyl group, such as benzyl, xylyl, mesityl, phenylethyl, methylbenzyl, naphthylmethyl and naphthylethyl, containing up to twelve carbon atoms. The term "aryl," as used herein, refers to an aromatic group of up to twelve carbon atoms. Typical aromatic groups include phenyl, naphthyl, lower alkylphenyl, such as methylphenyl, ethylphenyl, t-butylphenyl or isopropylphenyl, lower alkylthiophenyl, such as methylthiophenyl, ethylthiophenyl and isopropylthiophenyl, lower alkoxyphenyl, such as methoxyphenyl and ethoxyphenyl, halophenyl, such as chlorophenyl, bromophenyl, iodophenyl and fluorophenyl, nitrophenyl and lower alkenylphenyl, such as vinylphenyl and allylphenyl. In the case of substituted phenyl, the substituted such as lower alkyl, lower alkylthio, lower alkoxy, halo, nitro, lower alkenyl, carbonyl, lower alkoxycarbonyl and cyano can be in one or more positions of the phenyl ring, usually in the para position.

The term "hydroxyalkyl," as used herein, refers to an alkoxy group substituted with one hydroxy group, e.g., hydroxymethyl, p-hydroxyethyl and 4-hydroxypentyl. The term "alkoxyalkyl," as used herein, refers to an alkyl group substituted with one alkoxy group, e.g., methoxymethyl, 2-methoxyethyl, 4-ethoxybutyl, n-propoxyethyl and t-butoxyethyl. The term "alkenyl," as used herein, refers to an ethylenically unsaturated hydrocarbon group, branched or straight chain, having a chain length of two to twelve carbon atoms, e.g., allyl, vinyl, 3-butenyl, 2-hexenyl and i-propenyl. Whenever any of the foregoing terms are modified by the word "lower," the chain length of the group is not more than six carbon atoms with the exception of lower alkoxyalkyl and lower alkylthiaalkyl in which event a total chain length of twelve carbon atoms is the maximum.

The term "carboxylic acyl," as used herein, refers to the acyl group of a carboxylic acid, anhydride or halide. The acyl group is determined by the particular carboxylic acid, anhydride or halide employed in the esterification. Although no upper limitation need be placed on the number of carbon atoms contained in the acyl group within the scope of the present invention, generally it contains from one to eighteen carbon atoms. Typical esters of the present invention include formate, acetate, propionate, enanthate, benzoate, trimethylacetate, trichloroacetate, trifluoroacetate, t-butylacetate, phenoxyacetate, cyclopentylpropionate, aminoacetate, β-chloropropionate, adamantoate, octadec-9-enoate, dichloroacetate, butyrate, pentanoate, hexanoate, phenylacetate, p-methylbenzoate, β-phenylpropionate, 3,4-dimethylbenzoate, p-isopropylbenzoate, cyclohexylacetate, stearate, methacrylate, p-chloromethylbenzoate, p-methoxybenzoate and p-nitrobenzoate.

The term "alkyl" refers to a branched or straight chain saturated aliphatic hydrocarbon of one to twelve carbon atoms. The term "lower alkyl" refers to an alkyl group having a chain length of one to six carbon atoms.

The term "lower alkynyl," as used herein, refers to an acetylenically unsaturated hydrocarbon group, branched or straight chain, having a chain length of three to six carbon atoms, e.g., 3-butynyl, 2-propynyl, 3-pentynyl.

The presence of an olefinic bond at position C–2 and C–4 of the compounds of Formula A give rise to four isomers, each of which is embraced by the present invention. The presence of three olefinic bonds in compounds of Formula B give rise to eight isomers, each of which is embraced by the present invention. As mentioned above, a mixture of isomers is suitably employed for the control of insects, such as a mixture containing the trans(2), trans(4) isomer and the cis(2), trans(4) isomer. The conditions of the syntheses described herein and the reactants can be selected so as to favor formation of one isomer, such as the all trans isomer, over the formation of other isomers. The selection of appropriate conditions and reactants to favor formation of one isomer over another will be apparent to those of ordinary skill in the art giving due consideration to the specific examples hereinafter. See also Pattenden and Weedon, supra and Corey et al., supra. In the specific examples hereinafter, when isomerism is not specified, it is understood to include a mixture of isomers which, if desired, can be separated using known separation methods. Hereafter, when only one designation of configuration is given, the designation refers to position C-2,3 and the configuration is taken to be trans at position C-4,5 when not otherwise specified. The use of "trans/cis" and "cis/trans" is with reference to position C-2,3 and indicates a mixture of isomers.

The following examples are provided to illustrate the practice of the present invention. Temperature is given in degrees centigrade.

EXAMPLE 1

To a mixture of one g. of 3,7-dimethyloct-6-en-1-al, 1.5 g. of diethyl 3-ethoxycarbonyl-2-methylprop-2-enyl phosphonate and 50 ml. of dimethylformamide, under nitrogen, is slowly added sodium ethoxide (prepared from 200 mg. of sodium and 12 ml. of ethanol). The mixture is allowed to stand at room temperature for one hour and then is worked up with ether. The ethereal extracts are dried, concentrated and then chromatographed on silica plates eluting with hexane/ether to yield ethyl 3,7,11-trimethyldodeca-2,4,10-trienoate, which is predominantly trans at position C-2,3 and C-4,5.

By using diethyl 3-methoxycarbonyl-2-methylprop-2-enyl phosphonate and sodium methoxide, there is prepared methyl 3,7,11-trimethyldodeca-2,4,10-trienoate.

EXAMPLE 2

The process of Example 1 is repeated using each of the aldehydes under column (I) as the starting material to yield the respective ester under column (II):

(I)

3,7-dimethylnon-6-en-1-al,
3-ethyl-7-methylnon-6-en-1-al,
3,7-diethylnon-6-en-1-al,
4,8-dimethylnon-7-en-1-al,
3,6-dimethylhept-5-en-1-al,
3,6-dimethyloct-5-en-1-al, and
2,6-dimethylhept-5-en-1-al.

(II)

ethyl 3,7,11-trimethyltrideca-2,4,10-trienoate,
ethyl 3,11-dimethyl-7-ethyltrideca-2,4,10-trienoate,
ethyl 7,11-diethyl-3-methyltrideca-2,4,10-trienoate,
ethyl 3,8,12-trimethyltrideca-2,4,11-trienoate,
ethyl 3,7,10-trimethylundeca-2,4,9-trienoate,
ethyl 3,7,10-trimethyldodeca-2,4,9-trienoate, and
ethyl 3,6,10-trimethylundeca-2,4,9-trienoate.

EXAMPLE 3

A mixture of 1 g. of trans/cis methyl 3,7,11-trimethyldodeca-2,4,10-trienoate, 60 ml. of methanol, 0.5 g. of potassium hydroxide and 6 ml. of water is heated at reflux for about 8 hours. The mixture is then diluted with water, neutralized and extracted with ether. The organic phase is washed with water, dried over sodium sulfate and evaporated to yield trans/cis 3,7,11-trimethyldodeca-2,4,10-trienoic acid.

Using the foregoing procedure, the other esters of Example 2 are hydrolyzed to produce the respective free acids under column (III).

(III)

3,7,11-trimethyltrideca-2,4,10-trienoic acid,
3,11-dimethyl-7-ethyltrideca-2,4,10-trienoic acid,
7,11-diethyl-3-methyltrideca-2,4,10-trienoic acid,
3,8,12-trimethyltrideca-2,4,11-trienoic acid,
3,7,10-trimethylundeca-2,4,9-trienoic acid,
3,7,10-trimethyldodeca-2,4,9-trienoic acid, and
3,6,10-trimethylundeca-2,4,9-trienoic acid.

EXAMPLE 4

One gram of 3,7,11 - trimethyltrideca-2,4,10-trienoic acid in 30 ml. of benzene and one mol of sodium hydride is stirred about two hours and then a slight excess of oxalyl chloride is added at about 0° and stirred for one hour. The product is worked up by removal of solvent in vacuo and extraction with pentane to yield 3,7,11-trimethyltrideca-2,4,10-trienoyl chloride.

EXAMPLE 5

(A) To magnesium propynylide (15 g.) in 150 ml. of ether is slowly added 0.3 mole of 3,7-dimethyloct-6-en-1-al and the mixture then stirred overnight. Saturated aqueous ammonium chloride is added and the layers separated. The organic phase, combined with ether backwashings of aqueous phase, is washed with water, dried and solvent evaporated to yield 6,10-dimethyl-9-undecen-2-yn-4-ol which can be purified by chromatography.

(B) A mixture of 18.5 g. of the alkynyl alcohol of part (A), 80 g. of triethylorthoacetate and 0.7 g. of propionic acid is refluxed under a spinning band column to remove ethanol as it is formed. After the elimination of ethanol is about complete, the crude reaction product is distilled under vacuum to yield ethyl 3,7,11-trimethyldodeca-3,4,10-trienoate. Alternatively, the crude reaction product is purified by chromatography on silica.

(C) A solution of 1.0 g. of the allenic ester of part (B) in 20 ml. of ethanol is treated with 4 ml. of aqueous 2 N sodium hydroxide and left at room temperature for several minutes. The mixture is then poured into pentane and washed with saturated brine and separated. Evaporation of the organic phase yields ethyl 3,7,11-trimethyldodeca-2,4,10-trienoate.

EXAMPLE 6

The process of Example 5, part (A), is repeated using each of the aldehydes under column (I) as the starting material to yield the respective alkynyl alcohol under column (IV), each of which is reacted with triethylorthoacetate using the process of Example 5, part (B), to prepare the respective allenic ester under column (V).

(IV)

6,10-dimethyl-9-dodecen-2-yn-4-ol
6-methyl-10-ethyl-9-dodecen-2-yn-4-ol
6,10-diethyl-9-dodecen-2-yn-4-ol
7,11-dimethyl-10-dodecen-2-yn-4-ol
6,9-dimethyl-8-decen-2-yn-4-ol
6,9-dimethyl-8-undecen-2-yn-4-ol
5,9-dimethyl-8-decen-2-yn-4-ol (V)

ethyl 3,7,11-trimethyltrideca-3,4,10-trienoate
ethyl 3,11-dimethyl-7-ethyltrideca-3,4,10-trienoate
ethyl 3-methyl-7,11-diethyltrideca-3,4,10-trienoate
ethyl 3,8,12-trimethyltrideca-3,4,11-trienoate
ethyl 3,7,10-trimethylundeca-3,4,9-trienoate
ethyl 3,7,10-trimethyldodeca-3,4,9-trienoate
ethyl 3,6,10-trimethylundeca-3,4,9-trienoate Using the process of Example 5, part (C), each of the allenic esters under column (V) is rearranged by treatment with aqueous sodium hydroxide to produce the respective α,β-unsaturated ester.

EXAMPLE 7

To 126 mg. of a 57% dispersion of sodium hydride in oil is added pentane. The pentane is removed and the sodium hydride washed several times with pentane. To the washed sodium hydride is added 582 mg. of diethyl acetylmethylphosphonate in 5 ml. of tetrahydrofuran at −10° under argon. After several minutes, the solution is transferred to a solution of 425 mg. of 3,7-dimethyloct-6-en-1-al in about 4 ml. of dry tetrahydrofuran under argon over a period of about 20 minutes at room temperature. After about two hours, water is added followed by addition of ether and the layers separated. The organic layer is washed with saturated sodium chloride, dried over sodium sulfate and evaporated under reduced pressure to yield 6,10-dimethylundeca-3,9-dien-2-one.

EXAMPLE 8

One gram of triphenylphosphineacetylmethylene and 425 mg. of 3,7-dimethylnon-6-en-1-al are dissolved in 10 ml. of toluene and refluxed under nitrogen overnight. The toluene is distilled off and the formed triphenylphosphine oxide crystallized by addition of pentane. Filtration and evaporation of the pentane gives a residue, which is further purified by preparation of thin-layer chromatography to yield 6,10-dimethyldodeca-3,9-dien-2-one.

EXAMPLE 9

41 grams of 3,7-dimethyloct-6-en-1-al and 80 g. of recrystallized (ethyl acetate) triphenylphosphineacetylmethylene [Ramirex et al., J. Org. Chem. 22, 41 (1957)] are refluxed in one liter of dry toluene for 18 hours, under nitrogen. Most of the solvent is removed in vacuo, 500 ml. pentane is added and the mixture filtered. The flask and the triphenylphosphine oxide filter cake are washed several times with pentane. The filtrate is concentrated under vacuum to yield 6,10-dimethylundeca-3,9-dien-2-one.

EXAMPLE 10

Using the process of either Example 7, 8 or 9, each of the aldehydes under column (I) is converted into the respective di-unsaturated ketone under column (VI).

(VI)

6,10-dimethyldodeca-3,9-dien-2-one,
6-methyl-10-ethyldodeca-3,9-dien-2-one,
6,10-diethyldodeca-3,9-dien-2-one,
7,11-dimethyldodeca-3,10-dien-2-one,
6,9-dimethyldeca-3,8-dien-2-one,
6,9-dimethylundeca-3,8-dien-2-one, and
5,9-dimethyldeca-3,8-dien-2-one.

EXAMPLE 11

The carbanion of diethyl carbmethoxymethylphosphonate is reacted with 6,10-dimethylundeca-3,9-dien-2-one and each of the ketones under column (VI) using the procedure of either Example 1 or 7 to prepare the respective methyl esters under column (VII).

(VII)

methyl 3,7,11-trimethyldodeca-2,4,10-trienoate,
methyl 3,7,11-trimethyltrideca-2,4,10-trienoate,
methyl 3,11-dimethyl-7-ethyltrideca-2,4,10-trienoate,
methyl 3-methyl-7,11-diethyltrideca-2,4,10-trienoate,
methyl 3,8,12-trimethyltrideca-2,4,11-trienoate,
methyl 3,7,10-trimethylundeca-2,4,9-trienoate,
methyl 3,7,10-trimethyldodeca-2,4,9-trienoate, and
methyl 3,6,10-trimethylundeca-2,4,9-trienoate.

EXAMPLE 12

Anhydrous hydrogen chloride is bubbled into 100 ml. of dry carbon tetrachloride at 0° until six equivalents are taken up. Five grams of trans N,N-diethyl 3,7,11-trimethyldodeca-2,4,10-trienamide is added and the resulting mixture allowed to stand for about 48 hours at 0°. The mixture is evaporated under reduced pressure to yield trans N,N-diethyl 11-chloro-3,7,11-trimethyldodeca-2,4-dienamide, which is purified by chromatography.

EXAMPLE 13

One gram of trans N,N-diethyl 3,7,11-trimethyldodeca-2,4,10-trienamide is added to a solution of three equivalents of dry hydrogen fluoride in 30 ml. of dry tetrahydrofuran. The mixture is allowed to stand at 0° for 15 hours and is then washed with water, dried and evaporated under reduced pressure to yield trans N,N-diethyl 11-fluoro-3,7,11-trimethyldodeca-2,4 - dienamide, which can be purified by chromatography.

EXAMPLE 14

The process of Example 12 is repeated with the exception of using dry hydrogen bromide in place of hydrogen chloride to yield trans N,N-diethyl 11-bromo-3,7,11-trimethyldodeca-2,4-dienamide.

By treating the 11-bromide with anhydrous silver fluoride in acetonitrile under reflux conditions for about six hours, there is prepared trans N,N-diethyl 11-fluoro-3,7,11-trimethyldodeca-2,4-dienamide.

EXAMPLE 15

Chlorine gas is bubbled into 100 ml. of carbon tetrachloride at 0° until six equivalents is taken up. Twenty-five grams of trans N,N-diethyl 3,7,11-trimethyldodeca-2,4,10-trienamide is added and the mixture is then stirred and then allowed to stand at about 0° for 72 hours. The mixture is then evaporated to yield trans N,N-diethyl 10,11-dichloro-3,7,11-trimethyldodeca-2,4-dienamide, which can be purified by chromatography.

EXAMPLE 16

To a mixture of 5 g. of trans ethyl 3,7,11-trimethyldodeca - 2,4,10 - trienoate in 100 ml. of fluorotrichloromethane is slowly added four equivalents of dry fluorine in about one hour at about −78°. After stirring the mixture at this temperature for about 16 hours, the resultant mixture is evaporated and chromatographed on silica to yield N,N-diethyl 10,11 - difluoro-3,7,11-trimethyldodeca-2,4-dienamide, which is further purified by chromatography.

By using bromine in the process of Example 15, there is prepared trans N,N-diethyl 10,11-dibromo-3,7,11-trimethyldodeca-2,4-dienamide.

EXAMPLE 17

To a mixture of 1.9 g. of mercuric acetate, 6 ml. of water and 20 ml. of tetrahydrofuran is added 1.49 g. of trans ethyl 3,7,11-trimethyldodeca-2,4,10-trienoate slowly. After addition is complete, the reaction mixture is stirred for about 20 minutes. The mixture is cooled to about 0° and 6 ml. of aqueous sodium hydroxide (3 molar) is added followed by 0.49 g. of sodium borohydride in aqueous sodium hydroxide (about 3 molar). The mixture is stirred for about 30 minutes. The mixture is then decanted, concentrated, diluted with water and then extracted with ether. The ethereal extract is washed with water, dried over magnesium sulfate and the product chromatographed on silica gives ethyl 11-hydroxy-3,7,11-trimethyldodeca-2,4-dienoate (trans).

The above process is repeated using each of the unsaturated esters under column (II) to prepare the respective compound under column (X):

X ethyl 11-hydroxy-3,7,11-trimethyltrideca-2,4-dienoate,
ethyl 11-hydroxy-3,11-dimethyl-7-ethyltrideca-2,4-dienoate,
ethyl 11-hydroxy-7,11-diethyl-3-methyltrideca-2,4-dienoate,
ethyl 12-hydroxy-3,8,12-trimethyltrideca-2,4-dienoate,
ethyl 10-hydroxy-3,7,10-trimethylundeca-2,4-dienoate,
ethyl 10-hydroxy-3,7,10-trimethyldodeca-2,4-dienoate, and
ethyl 10-hydroxy-3,6,10-trimethylundeca-2,4-dienoate,

EXAMPLE 18

Each of the esters under column (VII) is used as the starting material in the process of Example 17 to prepare the respective hydroxyl under column (XI):

XI methyl 11-hydroxy-3,7,11-trimethyldodeca-2,4-dienoate,
methyl 11-hydroxy-3,7,11-trimethyltrideca-2,4-dienoate,
methyl 11-hydroxy-3,11-dimethyl-7-ethyltrideca-2,4-dienoate,
methyl 11-hydroxy-3-methyl-7,11-diethyltrideca-2,4-dienoate, methyl 12-hydroxy-3,8,12-trimethyltrideca-2,4-dienoate,
methyl 10-hydroxy-3,7,10-trimethylundeca-2,4-dienoate,
methyl 10-hydroxy-3,7,10-trimethyldodeca-2,4-dienoate, and
methyl 10-hydroxy-3,6,10-trimethylundeca-2,4-dienoate.

EXAMPLE 19

To a solution of 2 g. of trans ethyl 3,7,11-trimethyldodeca-2,4,10-trienoate in 20 ml. of ethanol, cooled to 0° in an ice bath, is added a suspension of 2.32 g. of mercuric acetate in 50 ml. of ethanol over 15 minutes. The reaction mixture is stirred for two hours and then, with cooling, 1.22 g. of potassium hydroxide in 20 ml. of ethanol is added. Then 0.139 g. of sodium borohydride is added in small portions and stirring continued for 30 minutes. The solution is decanted, then concentrated to half volume, diluted with 100 ml. of water and extracted with ether (3 × 50). The ethereal phase is washed with water, dried over magnesium sulfate and the crude product chromatographed on silica using hexane:ether to yield trans ethyl 11-ethoxy-3,7,11-trimethyldodeca-2,4-dienoate.

EXAMPLE 20

A mixture of 1 g. of trans ethyl 11-hydroxy-3,7,11-trimethyldodeca-2,4-dienoate, 10 ml. of acetic anhydride and 0.5 g. of dry sodium acetate is refluxed for about five hours. After cooling, excess anhydride is removed by vacuum and the residue extracted with ether. The ethereal extract is washed, dried over magnesium sulfate and evaporated to yield the corresponding acetate, trans ethyl 11-acetoxy-3,7,11-trimethyldodeca-2,4-dienoate.

EXAMPLE 21

A mixture of 2 g. of dry trans ethyl 11-hydroxy-3,7,11-trimethyldodeca-2,4-dienoate, 15 ml. of acetyl chloride and 20 ml. of dry pyridine under nitrogen is heated on a steam bath for about six hours. After cooling, the mixture is concentrated under vacuum and the residue taken up in ether. The ethereal extract is washed, dried over magnesium sulfate and evaporated to yield the corresponding acetate, trans ethyl 11-acetoxy-3,7,11-trimethyldodeca-2,4-dienoate.

The process of this example is repeated with the exception of using triethylamine in place of pyridine to yield the 11-acetate.

EXAMPLE 22

One gram of trans ethyl 11-hydroxy-3,7,11-trimethyldodeca-2,4-dienoate in 10 ml. of diglyme is added dropwise to a slurry of 1 g. of sodium hydride in 10 ml. of diglyme under nitrogen. To this mixture is added 0.9 g. of cyclohexylchloride. The reaction mixture is stirred at about 25° for 30 minutes and then quenched in ice water. The organic phase is separated and aqueous phase re-extracted with ether. The organic materials are washed with water, dried over sodium sulfate and evaporated to yield the cyclohexyl ether of trans ethyl 11-hydroxy-3,7,11-trimethyldodeca 2,4-dienoate.

By using each of benzyl chloride and cyclopentyl chloride in the foregoing procedure, the corresponding benzyl ether and cyclopentyl ether is prepared.

EXAMPLE 23

By use of the procedure of Example 21, ethyl 11-hydroxy-3,7,11-trimethyldodeca-2,4-dienoate is converted into the corresponding 11-chloroacetate, 11-dichloroacetate and 11-trichloroacetate using chloroacetyl chloride, dichloroacetyl chloride and trichloroacetyl chloride, respectively.

The respective 11-trifluoroacetate, propionate, n-butanoate, n-pentanoate and n-hexanoate esters of ethyl 11-hydroxy-3,7,11-trimethyldodeca-2,4-dienoate are prepared according to the process of Example 20 using trifluoroacetic anhydride, propionic anhydride, n-butyric anhydride, n-pentanoic anhydride and n-hexanoic anhydride or according to the process of Example 21 using the corresponding acid chloride.

EXAMPLE 24

A mixture of 20 ml. of dry formic acid and 2 g. of trans ethyl 3,7,11-trimethyldodeca-2,4,10-trienoate is heated at 50° for two hours and then poured onto ice cold potassium bicarbonate solution. The reaction is worked up by extraction with ether, washing the ethereal extract, drying over magnesium sulfate and evaporation to yield the formate of trans ethyl 11-hydroxy-3,7,11-trimethyldodeca-2,4-dienoate.

Using the above process, the formates of Formula A are prepared from the corresponding precursor of Formula B having a terminal olefinic bond.

EXAMPLE 25

Fifteen grams of mercuric acetate in 50 ml. of dry ethanol is added to 12 g. of trans ethyl 3,7,11-trimethyldodeca-2,4,10-trienoate in 30 ml. of dry ethanol cooled in an ice bath. The temperature is allowed to come to room temperature by standing overnight. Then the mixture is cooled to 0°, 10 g. of potassium hydroxide in 150 ml. of ethanol is added followed by addition of 1.0 g. of sodium borohydride in small portions. After about 30 minutes at 0°, water is added and mixture left at room temperature for two hours. The mixture is filtered, filtrate concentrated and extracted with ether. The ethereal extract is washed, dried, and evaporated to yield trans ethyl 11 - ethoxy - 3,7,11 - trimethyldodeca-2,4-dienoate which is purified by distillation or chromatography.

By using methanol in the foregoing process in place of ethanol, there is prepared the respective 11-methyl ether. In the same way, each of isopropanol, t-butanol, and n-propanol is added to the terminal double bond to prepare:

ethyl 11-isopropoxy-3,7,11-trimethyldodeca-2,4-dienoate,
ethyl 11-t-butoxy-3,7,11-trimethyldodeca-2,4-dienoate, and
ethyl 11-n-propoxy-3,7,11-trimethyldodeca-2,4-dienoate.

EXAMPLE 26

Each of the tri-unsaturated esters under col. (VII) is used as the starting material in the process of Example 18 or 25 to yield the respective ethoxy substituted compound under col. (XII).

(XII)

methyl 11-ethoxy-3,7,11-trimethyldodeca-2,4-dienoate,
methyl 11-ethoxy-3,7,11-trimethyltrideca-2,4-dienoate,
methyl 11-ethoxy-3,11-dimethyl-7-ethyltrideca-2,4-dienoate,
methyl 11-ethoxy-3-methyl-7,11-diethyltrideca-2,4-dienoate,
methyl 12-ethoxy-3,8,12-trimethyltrideca-2,4-dienoate,
methyl 10-ethoxy-3,7,10-trimethylundeca-2,4-dienoate,
methyl 10-ethoxy-3,7,10-trimethyldodeca-2,4-dienoate, and
methyl 10-ethoxy-3,6,10-trimethylundeca-2,4-dienoate.

EXAMPLE 27

A mixture of 1 g. of trans methyl 11-ethoxy-3,7,11-trimethyldodeca-2,4-dienoate, 60 ml. of methanol, 0.5 g. of potassium hydroxide and 6 ml. of water is heated at reflux for about eight hours. The mixture is then diluted with water, neutralized and extracted with ether. The organic phase is washed with water, dried over sodium sulfate and evaporated to yield trans 11-ethoxy-3,7,11-trimethyldodeca-2,4-dienoic acid.

EXAMPLE 28

Using each of the esters under column (II) as the starting material in the process of either Example 19 or 25, there is prepared the respective substituted ester under column (XIII).

(XIII)

ethyl 11-ethoxy-3,7,11-trimethyldodeca-2,4-dienoate,
ethyl 11-ethoxy-3,7,11-trimethyltrideca-2,4-dienoate,
ethyl 11-ethoxy-3,11-dimethyl-7-ethyl trideca-2,4-dienoate,
ethyl 11-ethoxy-7,11-diethyl-3-methyltrideca-2,4-dienoate,
ethyl 12-ethoxy-3,8,12-trimethyltrideca-2,4-dienoate,
ethyl 10-ethoxy-3,7,10-trimethylundeca-2,4-dienoate,
ethyl 10-ethoxy-3,7,10-trimethyldodeca-2,4-dienoate, and
ethyl 10-ethoxy-3,6,10-trimethylundeca-2,4-dienoate.

EXAMPLE 29

(A) To a mixture of 50 g. of 7-methoxy-3,7-dimethyloctan-1-al, 75 g. of diethyl 3-ethoxycarbonyl-2-methylprop-2-enyl phosphonate (49% trans), and 500 ml. of dimethylformamide, under nitrogen, at 0°, and with stirring, is slowly added 9 g. of sodium in 250 ml. of ethanol. After addition is complete, the reaction is allowed to continue one hour at room temperature. The reaction is worked up with hexane, filtered through Florisil and filtrate evaporated to yield trans(2), trans(4) and cis(2), trans(4) ethyl 11-methoxy-3,7,11-trimethyldodeca-2,4-dienoate (about 60% trans, trans).

(B) A mixture of 45 g. of the ethyl ester of part (A), 350 ml. of ethanol, 100 ml. of water and 70 ml. of 50% aqueous NaOH is refluxed for 22 hours. Etanol is then removed under reduced pressure, water added followed by extraction with ether. The aqueous phase is adjusted to about pH 8 using aqueous HCl and 31 g. of S-benzyl-isothiouronium hydrochloride in water is added. The thus-formed salt is filtered, washed with water, recrystallized from aqueous methanol (twice) and then treated with aqueous HCl/ether and worked up to yield 11-methoxy-3,7,11-trimethyldodeca-2,4-dienoic acid which crystallizes on cooling.

(C) The acid (0.5 g.) of part (B) is methylated using diazomethane in ether, followed by chromatography on prep. TLC and distillation (short path) to prepare methyl 11-methoxy-3,7,11-trimethyldodeca-2,4-dienoate [95.2% trans(2), trans(4)]. In the same way, using diazoethane is prepared ethyl 11-methoxy-3,7,11-trimethyldodeca-2,4-dienoate [95.2% trans(2), trans(4)].

EXAMPLE 30

To 0.5 g. of the acid of Example 33 in 10 ml. of benzene, under nitrogen, is added 0.055 g. of sodium hydride. After stirring at room temperature for 15 minutes, 0.17 ml. of oxalyl chloride is added followed by stirring for 2.5 hours. Then 2 ml. of isopropanol is added. After about 3 hours, the reaction is worked up by extraction with ether, washing with sodium bicarbonate and brine, drying over calcium sulfate and isolation to yield isopropyl 11 - methoxy - 3,7,11 - trimethyldodeca - 2,4 - dienoate (about 91% trans, trans).

EXAMPLE 31

Sodium etoxide (prepared from 0.2 g. of sodium and 12 ml. of ethanol] is slowly added to a mixture of 1.1 g. of 7-ethoxy-3,7-dimethyloctan-1-al, diethyl 3-ethoxycarbonyl-2-methylprop-2-enyl phosphonate and 50 ml. of dimethylformamide, with stirring under nitrogen, at 0°. The reaction is stirred for 1.5 hours after addition is complete and then worked up by extraction with ether to yield 11-ethoxy-3,7,11-trimethyldodeca-2,4-dienoate, mostly trans-(2), trans(4), which can be further purified by chromatography or distillation.

EXAMPLE 32

A mixture of 5 g. of hydroxycitronellal (7-hydroxy-3,7-dimethyloctan-1-al), 8.5 g. of di-isopropyl 3-ethoxycarbonyl-2-methylprop-2-enyl phosphonate and 40 ml. of dimethylformamide, under nitrogen and cooled in an ice-bath, is stirred for 0.5 hour and then ground NaOH (1.165 g.) is added. The reaction mixture is stirred at room temperature for three hours and then hexane/water (1:1) added. The organic layer is washed with water and brine, dried over calcium sulfate and concentrated. The concentrate is filtered through Florisil using hexane and hexane/ether. The filtrate is concentrated and then distilled to yield ethyl 11-hydroxy-3,7,11-trimethyldodeca-2,4-dienoate (about 85% trans-2-trans-4).

EXAMPLE 33

To 40 ml. of ice cold ethanol is added 2.49 g. of acetyl chloride. The resulting solution is stirred at 0° for 15 minutes and 1.0 g. of trans N,N-diethyl 3,7,11-trimethyldodeca-2,4,10-trienamide added. The solution is stirred for one hour at 0° and for 48 hours at 25°. Solvent is removed under reduced pressure and the concentrate taken up in hexane. The hexane solution is washed with water until the aqueous wash is neutral and then with brine. The solution is dried over calcium sulfate and solvent evaporated to yield trans N,N-diethyl 11-chloro-3,7,11-trimethyldodeca-2,4-dienamide.

EXAMPLE 34

(A) 100 grams of 3,7-dimethyloct-6-en-1-ol is dissolved in 150 ml. of pyridine and 100 ml. of acetic anhydride and left at room temperature for about 48 hours. Then the mixture is extracted with ether and the ethereal extracts washed with water, 10% aqueous HCl and brine to yield 1-acetoxy-3,7-dimethyloct-6-ene, which is purified by distillation.

(B) 150 grams of mercuric acetate in 400 ml. of dry ethanol is added to 100 g. of 1-acetoxy-3,7-dimethyloct-6-ene (citronellol acetate) in 200 ml. of dry ethanol cooled in an ice-bath. The temperature is allowed to come to room temperature by standing overnight. Then the mixture is cooled to 0°, 100 g. of potassium hydroxide in 1.5 l. of ethanol is added followed by addition of 10 g. of sodium borohydride in small portions. After about 30 minutes at 0°, water (100 ml.) is added and the mixture left at room temperature for two hours. The mixture is filtered, filtrate concentrated and extracted with ether. The ethereal extract is washed, dried and evaporated to yield 7-ethoxy-3,7-dimethyloctan-1-ol which is purified by distillation or chromatography.

By using methanol in the foregoing process in place of ethanol, there is obtained 7-methoxy-3,7-dimethyloctan-1-ol.

(C) A mixture of 1.9 of 7-ethoxy-3,7-dimethyloctan-1-ol and 10 ml. of pyridine is added to a suspension of 8.0 g. of chromium trioxide in 100 ml. of pyridine with stirring under nitrogen. After about 4 hours at room temperature, the reaction is poured into saturated sodium bicarbonate and worked up with ether followed by washing with 2 N NaOH, water, 10% HCl, water and brine and evaporated under reduced pressure to dryness and then filtered with hexane to yield 7-ethoxy-3,7-dimethyloctan-1-al.

(D) A mixture of 9.0 g. of 7-ethoxy-3,7-dimethyloctan-1-al and 15 g. of triphenylphosphineacetylmethylene in 100 ml. of dry toluene, under nitrogen, is refluxed for 20 hours. Thereafter, the toluene is evaporated and pentane added to remove triphenylphosphine. After concentration, the product is distilled to yield 10-ethoxy-6,10-dimethyl-undec-3-en-2-one. The thus-prepared ketone is reacted with the carbanion of diethyl carbethoxymethylphosphonate using the procedure of Example 1 or 7 to prepare ethyl - 11 - ethoxy - 3,7,11-trimethyldodeca-2,4-dienoate.

EXAMPLE 35

Each of the aldehydes under col. (XIV) is reacted with the carbanion of di-isopropyl 3-isopropoxycarbonyl-2-methylprop-2-enyl phosphonate using the procedure of Example 32 to prepare the respective isopropyl ester under col. (XV).

(XIV)

3,6,7-trimethyloct-6-en-1-al,
3,6,7-trimethylnon-6-en-1-al,
2,5-dimethylhex-4-en-1-al,
2,4,5-trimethyl-4-en-1-al,
3,5,6-trimethylhept-5-en-1-al,
2,5,6-trimethylhept-5-en-1-al,
3,8-dimethylnon-7-en-1-al, and
3,9-dimethyldec-8-en-1-al.

(XV)

isopropyl 3,7,10,11-tetramethyldodeca-2,4,10-trienoate,
isopropyl 3,7,10,11-tetramethyltrideca-2,4,10-trienoate,
isopropyl 3,6,9-trimethyldeca-2,4-8-trienoate,
isopropyl 3,6,8,9-trimethyldeca-2,4,8-trienoate,
isopropyl 3,7,9,10-tetramethylundeca-2,4,9-trienoate,
isopropyl 3,6,9,10-tetramethylundeca-2,4,9-trienoate,
isoproply 3,7,12-trimethyltrideca-2,4,11-trienoate, and
isopropyl 3,7,13-trimethyltetradeca-2,4,12-trienoate.

The reaction of the aldehydes under col. (XIV) with the carbanion of diethyl 3-methoxycarbonyl-2-methylprop-2-enylphosphonate yields the respective methyl tri-unsaturated esters. In the same way the respective ethyl tri-unsaturated esters are prepared using diethyl 3-ethoxycarbonyl-2-methylprop-2-enylphosphonate.

Following the procedure of Example 19 or 25, methanol is added to the terminal double bond of each of the esters under col. (XV) to prepare:

isopropyl 11-methoxy-3,7,10,11-tetramethyldodeca-2,4-dienoate,
isopropyl 11-methoxy-3,7,10,11-tetramethyltrideca-2,4-dienoate,
isopropyl 9-methoxy-3,6,9-trimethyldeca-2,4-dienoate,
isopropyl 9-methoxy-3,6,8,9-tetramethyldecan-2,4-dienoate,
isopropyl 10-methoxy-3,7,9,10-tetramethylundeca-2,4-dienoate,
isopropyl 10-methoxy-3,6,9,10-tetramethylundeca-2,4-dienoate,
isopropyl 12-methoxy-3,7,12-trimethyltrideca-2,4-dienoate, and
isopropyl 13-methoxy-3,7,13-trimethyltetradeca-2,4-dienoate.

In the same way, ethanol is added to the terminal double bond to prepare the respective ethoxy substituted 2,4-dienoates. Using the procedure of Example 17, water is added to the terminal double bond to prepare the respective hydroxy-substituted 2,4-dienoate.

EXAMPLE 36

(A) Eighty ml. of a 3 M solution of methylmagnesium bromide in ether is added slowly to 31 g. of citronellal in 250 ml. of dry ether. The mixture is heated at reflux for about one hour, cooled to 0° and treated with saturated aqueous ammonium chloride until reaction subsides. The organic layer is separated and the aqueous layer extracted with ether. The organic layer and ether extracts are combined, washed with water and brine and dried over magnesium sulfate. Evaporation of the solvent gives 4,8-dimethylnon-7-en-2-ol.

(B) A solution of 47 g. of 4,8-dimethylnon-7-en-2-ol in 250 ml. of methylene chloride is cooled to about 10° as a solution of 46.4 g. of sodium dichromate in 125 ml. of water is added. The mixture is maintained at about 10° as a solution of 46.3 g. of sulfuric acid in 100 ml. of water is added over about 45 minutes. The mixture is allowed to attain room temperature and, after about 3 hours, the organic layer is separated and the aqueous layer is extracted with methylene chloride. The combined organic materials are washed with saturated potassium bicarbonate, water and saturated sodium chloride, dried over magnesium sulfate and evaporated to yield 4,8-dimethylnon-7-en-2-one.

The Grignard reaction of part (A) is repeated using each 3,7-dimethylnon-6-en-1-al, 3-methyl-7-ethylnon-6-en-1-al, 3,6,7-trimethyloct-6-en-1-al, 3,7,8-trimethylnon-7-en-1-al, 2,4,5-trimethylhex-4-en-1-al, 2,5-dimethylhex-4-en-1-al, 3,5,6-trimethylhept-5-en-1-al, 3,6-dimethylhept-5-en-1-al, 2,6-dimethylhept-5-en-1-al and 2,5,6-trimethylhept-5-en-1-al in place of citronellal to yield the respective secondary alcohol—

4,8-dimethyldec-7-en-2-ol,
4-methyl-8-ethyldec-7-en-2-ol,
4,7,8-trimethylnon-7-en-2-ol,
4,8,9-trimethyldec-8-en-2-ol,
3,5,6-trimethylhept-5-en-2-ol,
3,6-dimethylhept-5-en-2-ol,
4,6,7-trimethyloct-6-en-2-ol,
4,7-dimethyloct-6-en-2-ol,
3,7-dimethyloct-6-en-2-ol, and
3,6,7-trimethyloct-6-en-2-ol.

Each of the above alcohols is oxidized to prepare the respective ketone—

4,8-dimethyldec-7-en-2-one,
4-methyl-8-ethyldec-7-en-2-one,
4,7,8-trimethylnon-7-en-2-one,
4,8,9-trimethyldec-8-en-2-one,
3,5,6-trimethylhept-5-en-2-one,
3,6-dimethylhept-5-en-2-one,
4,6,7-trimethyloct-6-en-2-one,
4,7-dimethyloct-6-en-2-one,
3,7-dimethyloct-6-en-2-one, and
3,6,7-trimethyloct-6-en-2-one.

(C) Each of the ketones of part (B) is reacted with the carbanion of diethyl 3-ethoxycarbonyl-2-methylprop-2-enyl phosphonate according to procedures described above to prepare the respective tri-unsaturated ester, i.e.— ethyl 3,5,7,11-tetramethyldodeca-2,4,10-trienoate,
ethyl 3,5,7,11-tetramethyltrideca-2,4,10-trienoate,
ethyl 3,5,7-trimethyl-11-ethyltrideca-2,4,10-trienoate,
ethyl 3,5,7,10,11-pentamethyldodeca-2,4,10-trienoate,
ethyl 3,5,7,11,12-pentamethyltrideca-2,4,11-trienoate,
ethyl 3,5,6,8,9-pentamethyldeca-2,4,8-trienoate,
ethyl 3,5,6,9-tetramethyldeca-2,4,8-trienoate,
ethyl 3,5,7,9,10-pentamethylundeca-2,4,9-trienoate,
ethyl 3,5,7,10-tetramethylundeca-2,4-9-trienoate,
ethyl 3,5,6,10-tetramethylundeca-2,4,9-trienoate, and
ethyl 3,5,6,9,10-pentamethylundeca-2,4,9-trienoate.

EXAMPLE 37

(A) Each of the ketones of part (B) of Example 36 is reacted with the carbanion of diethyl 3-ethoxycarbonyl-1,2-dimethylprop-2-enylphosphonate to prepare the respective trienoate, i.e.— ethyl 3,4,5,7,11-pentamethyldodeca-2,4,10-trienoate,
ethyl 3,4,5,7,11-pentamethyltrideca-2,4,10-trienoate,
ethyl 3,4,5,7-tetramethyl-11-ethyltrideca-2,4,10-trienoate,
ethyl 3,4,5,7,10,11-hexamethyldodeca-2,4,10-trienoate,
ethyl 3,4,5,11,12-hexamethyltrideca-2,4,11-trienoate,
ethyl 3,4,6,8,9-hexamethyldeca-2,4,8-trienoate,
ethyl 3,4,5,6,9-pentamethyldeca-2,4,8-trienoate,
ethyl 3,4,5,7,9,10-hexamethylundeca-2,4,9-trienoate,
ethyl 3,4,5,7,10-pentamethylundeca-2,4,9-trienoate,
ethyl 3,4,5,6,10-pentamethylundeca-2,4,9-trienoate, and
ethyl 3,4,5,6,9,10-hexamethylundeca-2,4,9-trienoate.

(B) Each of the aldehydes under col. (I) is reacted with the carbanion of diethyl 3-ethoxycarbonyl-1,2-dimethylprop-2-enyl phosphonate to prepare the respective trienoate, i.e.— ethyl 3,4,7,11-tetramethyltrideca-2,4,10-trienoate,
ethyl 3,4,11-trimethyl-7-ethyltrideca-2,4,10-trienoate,
ethyl 3,4-dimethyl-7,11-diethyltrideca-2,4,10-trienoate,
ethyl 3,4,8,12-tetramethyltrideca-2,4,11-trienoate,
ethyl 3,4,7,10-tetramethylundeca-2,4,9-trienoate,
ethyl 3,4,7,10-tetramethyldodeca-2,4,9-trienoate, and
ethyl 3,4,6,10-tetramethylundeca-2,4,9-trienoate.

By use of the procedure of part B of this example, other aldehydes of Formula I ($R^{13}$ is hydrogen are converted into the respective ester of Formula B' wherein $R^{13}$ is hydrogen and $R^{12}$ is methyl or other lower alkyl. Similarly following the procedure of part (A) of this example, other ketones of Formula I ($R^{13}$ is lower alkyl) are converted into esters of Formula B, wherein each of $R^{12}$ and $R^{13}$ is lower alkyl. Using the process of part (C) of Example 36 other esters of the present invention of Formula B, wherein $R^{12}$ is hydrogen and $R^{13}$ is methyl or other lower alkyl, can be prepared using a ketone of Formula I ($R^{13}$ is lower alkyl) as the precursor.

(C) Each of the esters of this example and Example 36 can be hydrolyzed to the free acid according to the procedure of Example 3 or 29.

EXAMPLE 38

Methanol is added to the terminal bond of ethyl 3,4,7,11-tetramethyldodeca-2,4,10-trienoate using the process of Example 19 or 25 to give ethyl 11-methoxy-3,4,7,11-tetramethyldodeca-2,4-dienoate. In the same manner, water is added to give ethyl 11-hydroxy-3,4,7,11-tetramethyldodeca-2,4-dienoate. Similarly, there is prepared ethyl 11-methoxy - 3,5,7,11-tetramethyldodeca-2,4-dienoate and ethyl 11-hydroxy - 3,5,7,11-tetramethyldodeca-2,4-dienoate from ethyl 3,5,7,11 - tetramethyldodeca-2,4,10-trienoate.

EXAMPLE 39

(A) To a solution of 1.8 g. of 6,10-dimethylundeca-3,9-dien-2-one in 20 ml. of ethanol, cooled to 0° by an ice bath is added a suspension of 2.32 g. of mercuric acetate in 50 ml. of ethanol over 15 minutes. The reaction mixture is stirred for two hours and then, with cooling, to —20°, 1.22 g. of potassium hydroxide in 20 ml. of ethanol is added. Then 0.139 g. of sodium borohydride is added in small portions and stirring continued for 30 minutes at —20°. The solution is decanted, then concentrated to half volume, diluted with 100 ml. of water and extracted with ether (3× 50). The ethereal phase is washed with water, dried over magnesium sulfate and the crude product chromatographed on silica to yield 10-ethoxy-6,10-dimethylundec-3-en-2-one.

The process of this example is repeated using each of the compounds under column (VI) as the starting material to prepare the respective ethoxy substituted compound column (XVI).

(XVI)

10-ethoxy-6,10-dimethyldodec-3-en-2-one,
10-ethoxy-6-methyl-10-ethyldodec-3-en-2-one,
10-ethoxy-6,10-diethyldodec-3-en-2-one,
11-ethoxy-7,11-dimethyldodec-3-en-2-one,
9-ethoxy-6,9-dimethyldec-3-en-2-one,
9-ethoxy-6,9-dimethylundec-3-en-2-one, and
9-ethoxy-5,9-dimethyldec-3-en-2-one.

Following the process of Example 11, 10-ethoxy-6,10-dimethylundec-3-en-2-one is converted into methyl 11-ethoxy-3,7,11-trimethyldodeca-2,4-dienoate. Reaction of 10-ethoxy-6,10-dimethylundec-3-en-2-one with the carbanion of diethyl carboethoxymethylphosphonate yields ethyl 11-ethoxy-3,7,11-trimethyldodeca-2,4-dienoate.

By using other alcohols in the process of this example in lieu of ethanol, such as methanol, etc., the respective ethers are obtained, e.g. 10-methoxy-6,10-dimethylundec-3-en-2-one.

(B) The process of part (A) is repeated using the starting material 3,7-dimethyloct-6-en-1-al and each of the aldehydes under column (I) or the acetal thereof to prepare the respective compounds under column (XVII).

(XVII)

7-ethoxy-3,7-dimethyloctan-1-al,
7-ethoxy-3,7-dimethylnonan-1-al,
7-ethoxy-3-ethyl-7-methylnonan-1-al,
7-ethoxy-3,7-diethylnon-1-al,
8-ethoxy-4,8-dimethylnonan-1-al,
6-ethoxy-3,6-dimethylheptan-1-al,
6-ethoxy-3,6-dimethyloctan-1-al, and
6-ethoxy-2,6-dimethylheptan-1-al.

Using 7-ethoxy-3,7-dimethyloctan-1-al as the starting material in the process of either Example 7, 8 or 9, there is prepared 10-ethoxy-6,10-dimethylundec-3-en-2-one.

EXAMPLE 40

Two grams of 3,7,11-trimethyltrideca-2,4,10-trienoic acid chloride is added to 50 ml. of benzene, cooled to 0° and saturated with ammonia under nitrogen. The mixture is allowed to stand for about one hour and then it is washed with water, dried over sodium sulfate and evaporated to yield 3,7,11-trimethyltrideca-2,4,10-trienamide.

EXAMPLE 41

Three grams of 3,7,11-trimethyldodeca-2,4,10-trienoyl chloride in benzene is mixed with 2.5 g. of diethylamine in benzene and the resulting mixture allowed to stand at room temperature for about two hours. The mixture is concentrated under reduced pressure and the residue taken up in benzene, washed with dilute aqueous sodium bicarbonate and water, dried over sodium sulfate and evaporated to yield N,N-diethyl 3,7,11-trimethyldodeca-2,4,10-trienamide.

By use of the foregoing procedure, each of dimethylamine, ethylamine, pyrrolidine, piperidine, aniline, morpholine and 2-methoxyethylamine is reacted with the acid chloride to yield the corresponding amide, that is, N,N-dimethyl 3,7,11 - trimethyldodeca - 2,4,10 - trienamide, N-ethyl 3,7,11-trimethyldodeca-2,4,10-trienamide, etc.

EXAMPLE 42

Two grams of 3,7,11-trimethyltrideca-2,4,10-trienoyl chloride is added to a solution of 2 g. of 4-ethylpiperazine and 20 ml. of tetrahydrofuran. The mixture is allowed to stand for four hours at 0°, then 50 ml. of benzene is added and the resulting mixture washed with water, dried over sodium sulfate and evaporated to yield N-(4'-ethylpiperazino)-3,7,11-trimethyltrideca-2,4,10-trienamide.

EXAMPLE 43

Following the process of Example 41, the acid chloride of each of the acids under column (III) is reacted with diethylamine to prepare the respective amide:

N,N-diethyl 3,7,11-trimethyltrideca-2,4,10-trienamide,
N,N-diethyl 3,11-dimethyl-7-ethyltrideca-2,4,10-trienamide,
N,N-diethyl 3-methyl-7,11-diethyltrideca-2,4,10-trienamide,
N,N-diethyl 3,8,12-trimethyltrideca-2,4,11-trienamide,
N,N-diethyl 3,7,10-trimethylundeca-2,4,9-trienamide,
N,N-diethyl 3,7,10-trimethyldodeca-2,4,9-trienamide, and
N,N-diethyl 3,6,10-trimethylundeca-2,4,9-trienamide.

EXAMPLE 44

The process of Example 1 is repeated with the exception of using diethyl 3-(N,N-diethylcarbonyl)-2-methylprop-2-enyl phosphonamide in place of the phosphonate to yield N,N - diethyl 3,7,11-trimethyldodeca-2,4,10-trienamide.

EXAMPLE 45

Sodium hydride (1.7 g., 57% in oil) is washed three times with dry hexane. The hexane is removed and 15 ml. of dry tetrahydrofuran is added. N,N-diethyl diethoxyphosphonoacetamide (0.9 g.), dissolved in 5 ml. of dry tetrahydrofuran, is added and stirred for about 40 minutes (0°). Then about 0.7 g. of 6,10-dimethyldodeca-3,9-dien-2-one in 5 ml. of dry tetrahydrofuran is added with stirring and cooling with an ice-bath. The ice-bath is removed after addition is completed and stirring continued for about two hours. Then the mixture is poured into water and extracted with ether. The ether extracts are combined, washed with water, dried over magnesium sulfate and evaporated under reduced pressure to yield cis/trans N,N - diethyl 3,7,11-trimethyltrideca-2,4,10-trienamide.

EXAMPLE 46

The procedure of Example 12 or 33 is repeated using N,N-diethyl 3,7,11-trimethyldodeca-2,4,10-trienamide and the amides of Example 43 to prepare:

N,N-diethyl 11-chloro-3,7,11-trimethyldodeca-2,4-dienamide,
N,N-diethyl 11-chloro-3,7,11-trimethyltrideca-2,4-dienamide,
N,N-diethyl 11-chloro-3,11-dimethyl-7-ethyltrideca-2,4-dienamide,
N,N-diethyl 11-chloro-3-methyl-7,11-diethyltrideca-2,4-dienamide,
N,N-diethyl 12-chloro-3,8,12-trimethyltrideca-2,4-dienamide,
N,N-diethyl 10-chloro-3,7,10-trimethylundeca-2,4-dienamide,
N,N-diethyl 10-chloro-3,7,10-trimethyldodeca-2,4-dienamide,
N,N-diethyl 10-chloro-3,6,10-trimethylundeca-2,4-dienamide.

Each of N,N-dimethyl 3,7,11-trimethyltrideca-2,4,10-trienamide, N-methyl 3,7,11-trimethyltrideca-2,4,10-trienamide, N,N-isopropyl 3,7,11-trimethyltrideca-2,4,10-trienamide, N-ethyl 3,7,11-trimethyldodeca-2,4,10-trienamide and N,N-di-n-butyl 3,7,11-trimethyldodeca-2,4,10-trienamide is used as the starting material in the process of Example 12 or 33 to prepare the respective compound, that is—N,N-dimethyl 11-chloro-3,7,11-trimethyltrideca-2,4-dienamide, N-methyl 11-chloro-3,7,11-trimethyltrideca-2,4-dienamide, N,N-isopropyl 11-chloro-3,7,11-trimethyltrideca-2,4-dienamide, N-ethyl 11-chloro-3,7,11-trimethyldodeca-2,4-dienamide and N,N-di-n-butyl 11-chloro-3,7,11-trimethyldodeca-2,4-dienamide.

Using the procedure of Examples 15 and 16, each of trans N,N-diethyl 10,11-dichloro-3,7,11-trimethyldodeca-2,4-dienamide, trans N,N-diethyl 10,11-difluoro-3,7,11-trimethyldodeca-2,4-dienamide and trans N,N-diethyl 10,11-dibromo - 3,7,11 - trimethyldodeca-2,4-dienamide is prepared from trans N,N-diethyl 3,7,11-trimethyldodeca-2,4,10-trienamide.

Following the procedure of Examples 13 and 14, each of N,N-diethyl 11-fluoro-3,7,11-trimethyldodeca-2,4-dienamide and N,N-diethyl 11-bromo-3,7,11-trimethyldodeca-2,4-dienamide is prepared from N,N-diethyl 3,7,11-trimethyldodeca-2,4,10-trienamide.

EXAMPLE 47

The procedure of Example 17 is utilized for the addition of water to the terminal double bond of N,N-diethyl 3,7,11-trimethyldodeca-2,4,10-trienamide and each of the amides of Example 43 to prepare:

N,N-diethyl 11-hydroxy-3,7,11-trimethyldodeca-2,4-dienamide,
N,N-diethyl 11-hydroxy-3,7,11-trimethyltrideca-2,4-dienamide,
N,N-diethyl 11-hydroxy-3,11-dimethyl-7-ethyltrideca-2,4-dienamide,
N,N-diethyl 11-hydroxy-3-methyl-7,11-diethyltrideca-2,4-dienamide,
N,N-diethyl 12-hydroxy-3,8,12-trimethyltrideca-2,4-dienamide,
N,N-diethyl 10-hydroxy-3,7,10-trimethylundeca-2,4-dienamide,
N,N-diethyl 10-hydroxy-3,7,10-trimethyldodeca-2,4-dienamide, and
N,N-diethyl 10-hydroxy-3,6,10-trimethylundeca-2,4-dienamide.

Each of N,N-dimethyl 3,7,11-trimethyltrideca-2,4,10-trienamide, N-methyl 3,7,11 - trimethyltrideca - 2,4,10-trienamide, N,N-isopropyl 3,7,11 - trimethyltrideca-2,4,10-trienamide, N-ethyl 3,7,11 - trimethyldodeca - 2,4,10 - trienamide and N,N-di-n-butyl 3,7,11 - trimethyldodeca-2,4,10 - trienamide is used as the starting material in the process of Example 17 to prepare the respective hydroxyl, that is—N,N - dimethyl 11- hydroxy - 3,7,11 - trimethyltrideca - 2,4 - dienamide, N-methyl 11-hydroxy-3,7,11-trimethyltrideca - 2,4 - dienamide, N,N-isopropyl 11 - hydroxy - 3,7,11 - trimethyltrideca - 2,4 - dienamide, N-ethyl 11 - hydroxy - 3,7,11 - trimethyldodeca - 2,4 - dienamide and N,N-di-n-butyl 11-hydroxy-3,7,11-trimethyldodeca-2,4-dienamide.

Following the procedure of Example 19 or 25, ethanol is added to the terminal bond of N,N-diethyl 3,7,11-trimethyldodeca - 2,4,10 - trienamide and each of the amides of Example 43 to prepare:

N,N-diethyl 11-ethoxy-3,7,11-trimethyldodeca-2,4-dienamide,
N,N-diethyl 11-ethoxy-3,7,11-trimethyltrideca-2,4-dienamide,
N,N-diethyl 11-ethoxy-3,11-dimethyl-7-ethyltrideca-2,4-dienamide,
N,N-diethyl 11-ethoxy-3-methyl-7,11-diethyltrideca-2,4-dienamide,
N,N-diethyl 12-ethoxy-3,8,12-trimethyltrideca-2,4-dienamide,
N,N-diethyl 10-ethoxy-3,7,10-trimethyltrideca-2,4-dienamide,
N,N-diethyl 10-ethoxy-3,7,10-trimethyldodeca-2,4-dienamide,
N,N-diethyl 10-ethoxy-3,6,10-trimethylundeca-2,4-dienamide.

The respective methoxy 2,4 - dienamides are prepared by repeating the above process and using methanol in place of ethanol. Thus, there is prepared N,N-diethyl 11-methoxy - 3,7,11 - trimethyldodeca - 2,4 - dienamide, N-ethyl 11 - methoxy-3,7,11-trimethyldodeca-2,4-dienamide, etc.

Each of the acid chlorides, 11-methoxy-3,7,11-trimethyldodeca-2,4-dienoyl chloride,
10-methoxy-3,7,10-trimethylundeca-2,4-dienoyl chloride,
11-methoxy-3,7,11-trimethyltrideca-2,4-dienoyl chloride,
11-methoxy-3,7,10,11-tetramethyldodeca-2,4-dienoyl chloride,
11-methoxy-3,11-dimethyl-7-ethyltrideca-2,4-dienoyl chloride,
11-methoxy-3,5,7,11-tetramethyldodeca-2,4-dienoyl chloride,
11-methoxy-3,4,7,11-tetramethyldodeca-2,4-dienoyl chloride, and
11-methoxy-3,5,7,10,11-pentamethyldodeca-2,4-dienoyl chloride is reacted with ethylamine using the procedure of Example 41 to prepare the respective amide, i.e., N-ethyl 11-methoxy-3,7,11-trimethyldodeca-2,4-dienamide,
N-ethyl 10-methoxy-3,7,10-trimethylundeca-2,4-dienamide,
N-ethyl 11-methoxy-3,7,11-trimethyltrideca-2,4-dienamide,
N-ethyl 11-methoxy-3,7,10,11-tetramethyldodeca-2,4-dienamide,
N-ethyl 11-methoxy-3,11-dimethyl-7-ethyltrideca-2,4-dienamide,
N-ethyl 11-methoxy-3,5,7,11-tetramethyldodeca-2,4-dienamide,
N-ethyl 11-methoxy-3,4,7,11-tetramethyldodeca-2,4-dienamide, and
N-ethyl 11-methoxy-3,5,7,10,11-pentamethyldodeca-2,4-dienamide.

The reaction of 11-hydroxy-3,7,11-trimethyldodeca-2,4-dienoyl chloride with ethylamine affords N-ethyl 11-hydroxy-3,7,11-trimethyldodeca-2,4-dienamide.

By use of the foregoing procedure, each of dimethylamine, isopropylamine, methylethylamine, pyrrolidine, piperidine, aniline, morpholine and 2-methoxyethylamine is reacted with 11-methoxy - 3,7,11 - trimethyldodeca-2,4-dienoyl chloride to yield the corresponding amide, that is—

N-isobutyl 11-methoxy-3,7,11-trimethyldodeca-2,4-dienamide,
N-isopropyl 11-methoxy-3,7,11-trimethyldodeca-2,4-dienamide,
N-methyl-N-ethyl 11-methoxy-3,7,11-trimethyldodeca-2,4-dienamide,
pyrrolidino 11-methoxy-3,7,11-trimethyldodeca-2,4-dienamide,
piperidino 11-methoxy-3,7,11-trimethyldodeca-2,4-dienamide,
N-phenyl 11-methoxy-3,7,11-trimethyldodeca-2,4-dienamide,
morpholino 11-methoxy-3,7,11-trimethyldodeca-2,4-dienamide, and
N-(2'-methoxyethyl) 11-methoxy-3,7,11-trimethyldodeca-2,4-dienamide.

EXAMPLE 48

Each of s - butylamine, isobutylamine, t - butylamine, methylisopropylamine, ethyl - n - propylamine, cyclohexylamine, allylamine, methallylamine, ethenylamine, 2-hydroxypropylamine and benzylamine is reacted with 11-methoxy - 3,7,11 - trimethyldodeca - 2,4 - dienoyl chloride to prepare the respective amide, that is—

N-(s-butyl) 11-methoxy-3,7,11-trimethyldodeca-2,4-dienamide,
N-isobutyl 11-methoxy-3,7,11-trimethyldodeca-2,4-dienamide,
N-(t-butyl) 11-methoxy-3,7,11-trimethyldodeca-2,4-dienamide,
N-methyl N-isopropyl 11-methoxy-3,7,11-trimethyldodeca-2,4-dienamide,
N-methyl-N-propyl 11-methoxy-3,7,11-trimethyldodeca-2,4-dienamide,
N-cyclohexyl 11-methoxy-3,7,11-trimethyldodeca-2,4-dienamide,
N-allyl 11-methoxy-3,7,11-trimethyldodeca-2,4-dienamide,
N-methallyl 11-methoxy-3,7,11-trimethyldodeca-2,4-dienamide,
N-ethenyl 11-methoxy-3,7,11-trimethyldodeca-2,4-dienamide,
N-(2'-hydroxypropyl) 11-methoxy-3,7,11-trimethyldodeca-2,4-dienamide, and
N-benzyl 11-methoxy-3,7,11-trimethyldodeca-2,4-dienamide.

EXAMPLE 49

To a solution of 6.14 g. of 11-methoxy-3,7,11-trimethyldodeca-2,4-dienoic acid and dry benzene, under nitrogen, is added 7.7 ml. of oxalyl chloride. The reaction is stirred for two hours at room temperature and then solvent removed under reduced pressure. Then 8 ml. of diethylamine in chilled dry benzene is added. The mixture is allowed to come to room temperature and then is stirred for 1.5 hours. The mixture is washed with dilute hydrochloric acid, water and brine and ether added followed by drying over calcium sulfate and solvent evaporated to yield N,N-diethyl 11 - methoxy - 3,7,11 - trimethyldodeca-2,4-dienamide, which can be purified by preparative thin-layer chromatography using ethyl acetate/hexane.

The process of this example is repeated using ethylamine in place of diethylamine to prepare N-ethyl 11-methoxy-3,7,11-trimethyldodeca-2,4-dienamide.

The process of this example is repeated using isopropylamine in place of diethylamine to prepare N-isopropyl 11-methoxy-3,7,11-trimethyldodeca-2,4-dienamide.

Three groups of 30 each of *Aedes aegypti*, fourth instar larvae, in 50 ml. of tap water containing a few drops of liver powder suspension, room temperature of 28° and photoperiod of 18 hours, are treated with N-ethyl 11-methoxy-3,7,11 - trimethyldodeca-2,4-dienamide (about 73% trans,trans) using 50 microliters of acetone as the carrier at three different dosage levels. A fourth group is maintained under identical conditions. Each group is scored after seven days by the following system: 0=normal adult, completly emerged (free or floating); 1=abnormal adult, non-viable; 2=incompletely emerged adult; 3=dead pupa; and 4=dead larvae. For each group, the total number of animals in classes 1-4 is divided by 30 to determine the percentage result. The $ID_{50}$ is computed by plotting on semi-logarithmic paper, the dose on the horizontal axis and the percentage response on the verticle axis. The $ID_{50}$ was determined to be less than 0.1 p.p.m. Each of the larvae of the control group developed into normal adults.

Three groups of 20 each of *Tenebrio molitor* pupae (less than 24 hours old) maintained on wheat germ and bran, 25° room temperature, 18 hours light, are treated at 0.01, 0.1 and 1.0 μg. with N,N-diethyl 11-methoxy-3,7,11-trimethyldodeca-2,4-dienamide (approximately 52% trans,trans) using acetone carrier. The active agent is placed on the 5th abdominal sternite using a syringe. The $ID_{50}$ was less than 0.001 μg.

A fine dust is prepared of 10 parts of N,N-diethyl 11-methoxy-3,7,11-trimethyldodeca-2,4-dienamide and 90 parts synthetic fine silica, by weight, by blending in a Waring Blendor. The fine dust is particularly useful for application to broadleaf plants for the control of aphids.

Although not intending to be limited by a theoretical explanation, the effectiveness of the compounds of the present invention to control insects is attributed to the property of these novel compounds to mimic the activity of juvenile hormone as demonstrated herein. While the methods of applying and carriers for conventional insecticides are usually adaptable to the practical use of the compounds of the present invention, the mechanism of action of these compounds is unlike that of conventional insecticides. Whereas conventional insecticides are dependent upon direct knock-down effect, toxity effect or paralyzing effect, the compounds of this invention achieve control by reason of their ability to inhibit metamorphosis, inhibit reproduction due to abnormal development, break diapause at an unfavorable time, or act as a direct insecticide, particularly at the embryo stage and larvae stage. Treatment of insects in accordance with the present invention can be achieved via ingestion of the active compound in the normal food of the insect and by topical application, that is—by contact of the epidermis of the insect as by spraying the insect and habitat of the insect or exposure to vapors of the active compound which penetrate into the insect.

The compounds of the present invention can be used in conjunction with other juvenile hormone active substances and conventional insecticides to obtain a broad spectrum of activity or to provide more immediate effect on very heterogeneous populations. Typical insecticides which may be combined with the compounds of the present invention are Malathion, Sevin, Vapona, Abate, synthetic and natural pyrethrins, and the like, and usually within the ratio of between 10:1 to 1:10, by weight.

EXAMPLE 50

To 3.14 g. of 11-methoxy-3,7,11-trimethyldodeca-2,4-dienoic acid in 50 ml. of dry benzene, stirring at room temperature under nitrogen, is added 4.5 ml. (about 4 equivalents) of oxalyl chloride. The reaction mixture is stirred at room temperature for three hours and then the solvent is removed under reduced pressure.

To the thus-prepared acid chloride is added 75 ml. of fresh dry benzene and the mixture is cooled in an ice-bath. Cyclopropyl amine (3.31 ml., about 4 equivalents) in 100 ml. of cold dry benzene is added to the acid chloride solution. The reaction mixture is allowed to come to room temperature and then is stirred for five minutes. Most of the solvent is removed in vacuo, the concentrate is poured into water and extracted with ether, and the organic extracts are washed with dilute hydrochloric acid, water and brine, dried over calcium sulfate and evaporated under vacuum to yield N-cyclopropyl 11-methoxy-3,7,11-trimethyldodeca-2,4-dienamide, which can be purified by chromatography and distillation.

EXAMPLE 51

Following the procedure of Example 41, each of dicyclopropyl amine, but-3-yn-1-yl amine, prop-2-yn-1-yl amine (propargyl amine) and cyclobutyl amine is reacted with the acid chloride of 11-methoxy-3,7,11-trimethyldodeca-2,4-dienoic acid to prepare:

N,N-di(cyclopropyl) 11-methoxy-3,7,11-trimethyl-dodeca-2,4-dienamide,
N-(but-3'-yn-1'-yl) 11-methoxy-3,7,11-trimethyldodeca-2,4-dienamide,
N-(prop-2'-yn-1'-yl) 11-methoxy-3,7,11-trimethyldodeca-2,4-dienamide, and
N-cyclobutyl 11-methoxy-3,7,11-trimethyldodeca-2,4-dienamide.

Following the procedure hereinabove, each of N-ethyl 11-methoxy-3,7,11-trimethyldodeca-2,4-dienamide (about 73% trans,trans) and N-ethyl 11-hydroxy-3,7,11-trimethyldodeca-2,4-dienamide (mostly trans,trans) was tested on *Tenebrio molitor* pupae resulting in an $ID_{50}$ of less than 0.001 μg.

Testing of N-isopropyl 11-methoxy-3,7,11-trimethyl-dodeca-2,4-dienamide (about 74% trans,trans) on *Aedes aegypti* according to the procedure described above resulted in an $IC_{50}$ of less than 0.1 p.p.m.

By use of an atomizing device, two seedling pea plants nine to eleven days of age are sprayed until run-off is imminent. Approximately 5 ml. of spray solution are dispensed during this operation. The said spray solution is prepared by added 1.0 ml. of an acetone solution which contains an appropriate, predetermined amount of N-ethyl 11 - methoxy-3,7,11-trimethyldodeca - 2,4 - dienamide (about 73% trans,trans), aqueous 0.01% emulsion of the surfactant Tween 20 [polyoxyethylene (20) sorbitan monolaurate]. A pair of pea plants is also sprayed with a 1 to 9 preparation of acetone in 0.01% Tween 20 to serve as spray diluent controls. The aqueous sprays on the plants are allowed to dry. Individual plants are then infested with ten third instar larvae of the pea aphid *Acyrthosiphon pisum* (Harris) which are 72 to 96 hours of age from time of birth. The aphids are then encaged by placing a disposable paperboard cylinder over the pot in which each sprayed and infested pea plant is maintained. The cylinder is closed at the top with fine mesh nylon screen to retain aphids which leave the plant. Encaged plant units are transferred to an environmental greenhouse maintained under constant conditions (25° C., 50% relative humidity, 16 hours light per day) and held therein for a period of six days. During this time, the said substrate of each pea plant is watered as may be necessary. At the end of this holding period, the aphids on each plant are scored using the following system: 0=a normal adult; 1=a moderately affected aphid which exhibits characters intermediate between those of the normal adult and the fourth instar larva; and 2=a strongly affected aphid which exhibits one or more of the following characteristics: evidence of an extra-larval instar(s), inhibited reproduction, genital pore sclerotized and cauda more larval than adult in shape. For each plant, the sum of the two products of the number of individuals in each category times the category score is divided by 20 (maximum score) to obtain the percent response. The result from the duplicate assays are averaged to obtain the percent response for the particular dose level applied. Two or more dose levels (stated as percent concentration) are applied. The $IC_{50}$ level for the compound is then determined from a semi-logarithmic plot of percent response versus the logarithm of the percent concentration. For N - ethyl 11 - methoxy-3,7,11-trimethyldodeca-2,4-dienamide, an $IC_{50}$ value of less than 0.03% was obtained. Controls exhibited negligible (2% or less) response throughout the similar series of assays.

Each of N-cyclopropyl 11 - methoxy-3,7,11-trimethyl-dodeca-2,4-dienamide (mostly trans,trans) and N-isopropyl 11-methoxy-3,7,11-trimethyldodeca - 2,4 - dienamide (mostly trans,trans) was applied to *Tenebrio molitor* pupae using the procedure described hereinabove resulting in $ID_{50}$ of less than 0.06 μg. and 0.02 μg., respectively.

What is claimed is:

1. A compound selected from those of the Formula A:

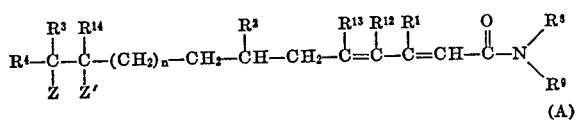

(A)

wherein,

Z is bromo, chloro, fluoro or the group —OR in which R is hydrogen, carboxylic acyl of one to eighteen carbon atoms, lower alkyl, cycloalkyl, aralkyl or aryl;
Z' is hydrogen, bromo, chloro or fluoro;
n is zero or the positive integer one;
each of $R^1$, $R^2$, $R^3$ and $R^4$ is lower alkyl;
each of $R^{12}$, $R^{13}$ and $R^{14}$ is hydrogen or lower alkyl; and
each of $R^8$ and R is hydrogen, alkyl, lower alkenyl, lower alkynyl, cycloalkyl, hydroxyalkyl, alkoxyalkyl, alkylthiaalkyl, aryl or aralkyl or, when taken together with the nitrogen atom to which they are attached, pyrrolidino, morpholino, piperidino, piperazino or 4-alkyl-piperazino, provided that when Z' is bromo, chloro or fluoro, then Z is bromo, chloro or fluoro, respectively.

2. A compound according to claim 1 wherein Z' is hydrogen; each of $R^1$, $R^2$, $R^3$ and $R^4$ is methyl or ethyl; each of $R^{12}$, $R^{13}$ and $R^{14}$ is hydrogen or methyl; and Z is chloro or the group —OR.

3. A compound according to claim 2 wherein each of $R^{12}$ and $R^{13}$ is hydrogen; $R^1$ is methyl; and Z is chloro or the group —OR in which R is hydrogen, methyl, ethyl, isopropyl, t-butyl or acetyl.

4. A compound according to claim 3 wherein $R^{14}$ is hydrogen and each of $R^2$, $R^3$ and $R^4$ is methyl.

5. The trans (2), trans (4) isomer of a compound according to claim 4.

6. A compound selected from those of the formula:

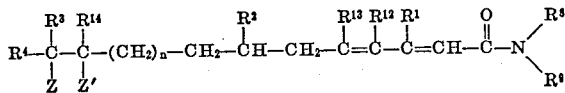

wherein,

Z is bromo, chloro, fluoro or the group —OR in which R is hydrogen, carboxylic acyl of one to eighteen carbon atoms, lower alkyl, cycloalkyl, aralkyl or aryl;
Z' is hydrogen, bromo, chloro or fluoro;
n is zero or the positive integer one;
each of $R^1$, $R^2$, $R^3$ and $R^4$ is lower alkyl;
each of $R^{12}$, $R^{13}$ and $R^{14}$ is hydrogen or lower alkyl; and
each of $R^8$ and $R^9$ is hydrogen, lower alkyl, lower alkenyl, lower alkynyl, cycloalkyl, lower hydroxyalkyl, lower alkoxyalkyl, lower alkylthiaalkyl, aryl or aralkyl.

7. A compound according to claim 6 wherein Z' is hydrogen; each of $R^1$, $R^2$, $R^3$ and $R^4$ is methyl or ethyl; each of $R^{12}$, $R^{13}$ and $R^{14}$ is hydrogen or methyl; and Z is chloro or the group —OR.

8. A compound according to claim 7 wherein $R^1$ is methyl; Z is chloro or the group —OR in which R is hydrogen, methyl, ethyl, isopropyl, t-butyl or acetyl; and each of $R^{12}$ and $R^{13}$ is hydrogen.

9. A compound according to claim 8 wherein each of $R^2$, $R^3$ and $R^4$ is methyl.

10. A compound according to claim 9 wherein $R^{14}$ is hydrogen.

11. The trans (2), trans (4) isomer of a compound of claim 10.

12. A compound according to claim 11 wherein Z is chloro or the group —OR in which R is hydrogen or methyl and each of $R^8$ and $R^9$ is hydrogen or lower alkyl.

13. A compound according to claim 12 wherein Z is the group —OR in which R is methyl and each of $R^8$ and $R^9$ is hydrogen, methyl, ethyl or isopropyl.

14. A compound according to claim 13 wherein each of $R^8$ and $R^9$ is ethyl.

15. A compound according to claim 13 wherein $R^8$ is hydrogen and $R^9$ is ethyl or isopropyl.

16. A compound according to claim 8 wherein each of $R^8$ and $R^9$ is hydrogen or lower alkyl.

17. A compound according to claim 6 wherein $R^1$ is methyl; each of $R^2$, $R^3$ and $R^4$ is methyl or ethyl; each of $R^{12}$, $R^{13}$ and $R^{14}$ is hydrogen or methyl; Z' is hydrogen; Z is chloro or the group —OR in which R is hydrogen, methyl, ethyl, isopropyl, t-butyl or acetyl; and n is one.

18. A compound according to claim 17 wherein each of $R^8$ and $R^9$ is hydrogen or lower alkyl.

19. A compound according to claim 18 wherein each of $R^{12}$ and $R^{13}$ is hydrogen; each of $R^2$ and $R^3$ is methyl; and Z is chloro or the group —OR in which R is hydrogen, methyl, ethyl or isopropyl.

20. A compound according to claim 19 wherein each of $R^8$ and $R^9$ is hydrogen, methyl, ethyl or isopropyl.

21. A compound according to claim 19 wherein $R^8$ is hydrogen and $R^9$ is ethyl.

22. The trans (2), trans (4) isomer of a compound according to claim 21 wherein Z is methoxy and $R^{14}$ is hydrogen.

23. The compound, N-ethyl 11-methoxy-3,7,11-trimethyldodeca-2 (trans), 4 (trans)-dienamide, according to claim 22.

24. A compound according to claim 19 wherein each of $R^8$ and $R^9$ is ethyl.

25. The trans (2), trans (4) isomer of a compound according to claim 24 wherein Z is methoxy and $R^{14}$ is hydrogen.

26. The compound, N,N-diethyl 11-methoxy-3,7,11-trimethyldodeca-2-(trans), 4 (trans)-dienamide, according to claim 25.

27. A compound according to claim 19 wherein $R^8$ is hydrogen and $R^9$ is isopropyl.

28. The trans (2), trans (4) isomer of a compound according to claim 27 wherein Z is methoxy and $R^{14}$ is hydrogen.

29. The compound, N-isopropyl 11-methoxy-3,7,11-trimethyldodeca-2 (trans), 4 (trans)-dienamide, according to claim 28.

30. A compound according to claim 10 wherein Z is chloro or the group —OR in which R is hydrogen or methyl; $R^8$ is hydrogen, cycloalkyl, lower alkenyl or lower alkynyl; and $R^9$ is cycloalkyl, lower alkenyl or lower alkynyl.

31. A compound according to claim 30 wherein Z is the group —OR in which R is methyl; $R^8$ is hydrogen; and $R^9$ is lower alkenyl of two to four carbon atoms.

32. A compound according to claim 30 wherein Z is the group —OR in which R is methyl and each of $R^8$ and $R^9$ is lower alkenyl of two to four carbon atoms.

33. A compound according to claim 30 wherein Z is the group —OR in which R is methyl; $R^8$ is hydrogen; and $R^9$ is cycloalkyl.

34. A compound according to claim 30 wherein Z is the group —OR in which R is methyl and each of $R^8$ and $R^9$ is cycloalkyl.

35. A compound according to claim 30 wherein Z is the group —OR in which R is methyl; $R^8$ is hydrogen; and $R^9$ is lower alkynyl of three to four carbon atoms.

36. A compound according to claim 30 wherein Z is the group —OR in which R is methyl and each of $R^8$ and $R^9$ is lower alkynyl of three to four carbon atoms.

References Cited

UNITED STATES PATENTS

| | | | |
|---|---|---|---|
| 3,732,282 | 5/1973 | Henrick et al. | 260—404 X |
| 3,692,851 | 9/1972 | Henrick et al. | 260—404 X |

LEWIS GOTTS, Primary Examiner

E. G. LOVE, Assistant Examiner

U.S. Cl. X.R.

260—247.2 A, 268 C, 293.86, 326.8; 424—320

UNITED STATES PATENT OFFICE
CERTIFICATE OF CORRECTION

Patent No. 3,803,185   Dated   April 9, 1974

Inventor(s) Clive A. Henrick and John B. Siddall

It is certified that error appears in the above-identified patent and that said Letters Patent are hereby corrected as shown below:

Claim 1, line 51, "each of $R^8$ and R is hydrogen" should read --each of $R^8$ and $R^9$ is hydrogen--; and line 56 to line 57, delete "provided that when Z' is bromo,. . .respectively."

Signed and sealed this 3rd day of December 1974.

(SEAL)
Attest:

McCOY M. GIBSON JR.
Attesting Officer

C. MARSHALL DANN
Commissioner of Patents